Aug. 4, 1970  H. STRANZINGER  3,522,618
STRUCTURAL ELEMENT AND ASSEMBLY
Filed Jan. 26, 1968  5 Sheets-Sheet 1
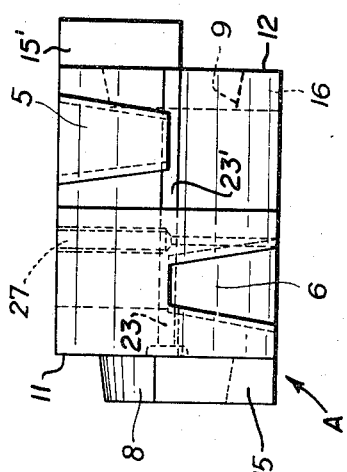
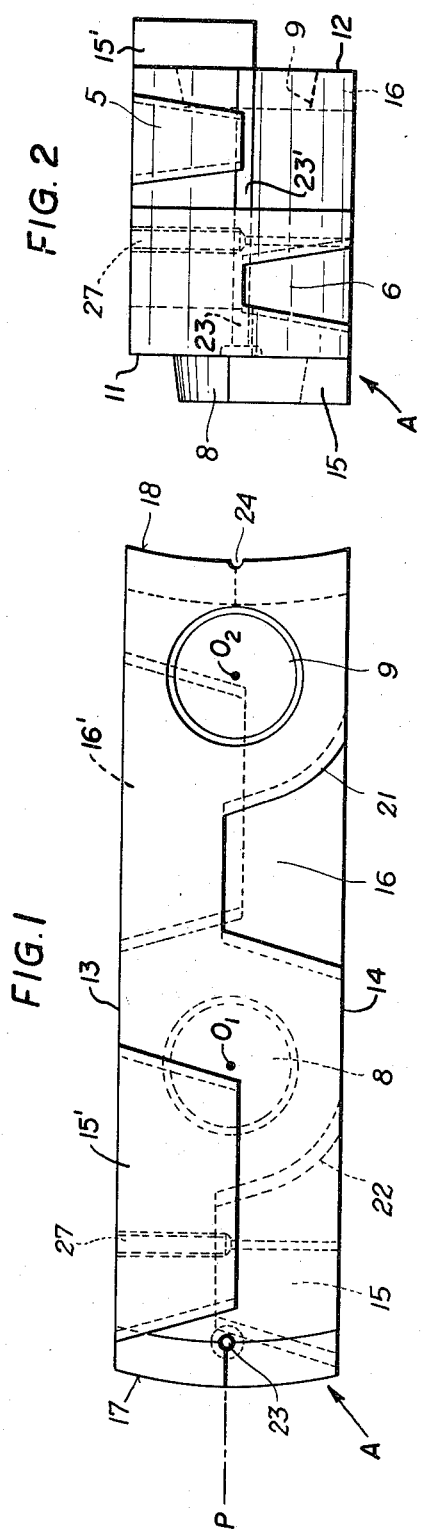
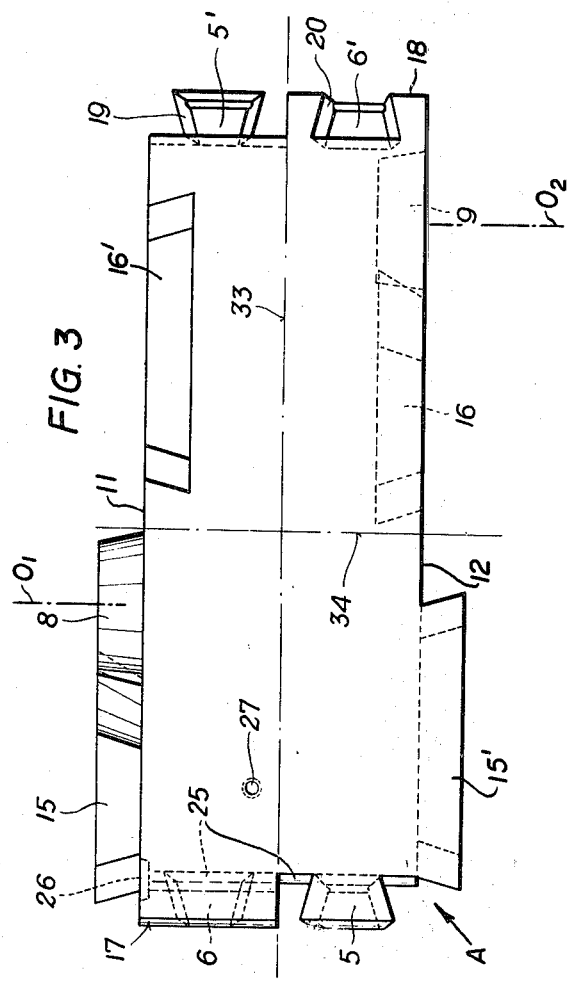
Hermann STRANZINGER
Inventor.
Karl G. Ross
Attorney Aug. 4, 1970  H. STRANZINGER  3,522,618
STRUCTURAL ELEMENT AND ASSEMBLY
Filed Jan. 26, 1968  5 Sheets-Sheet 2
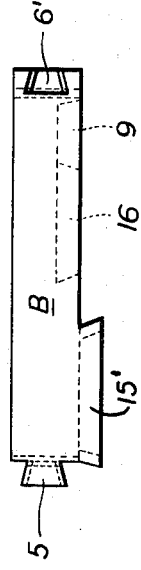
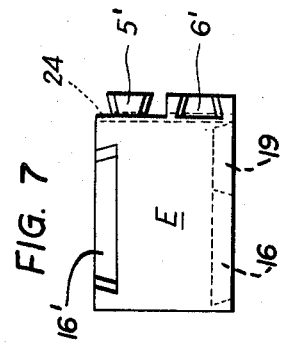
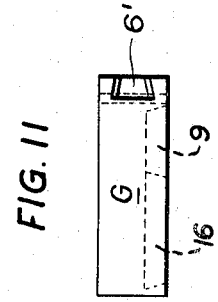
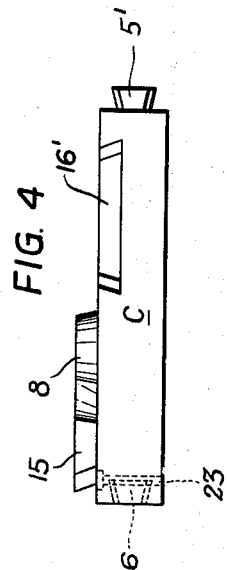
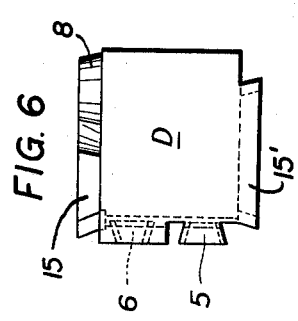
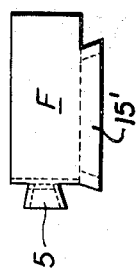
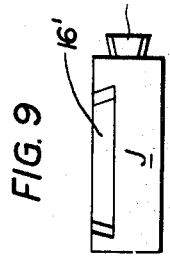
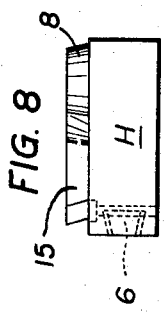
Hermann STRANZINGER
Inventor.
Attorney

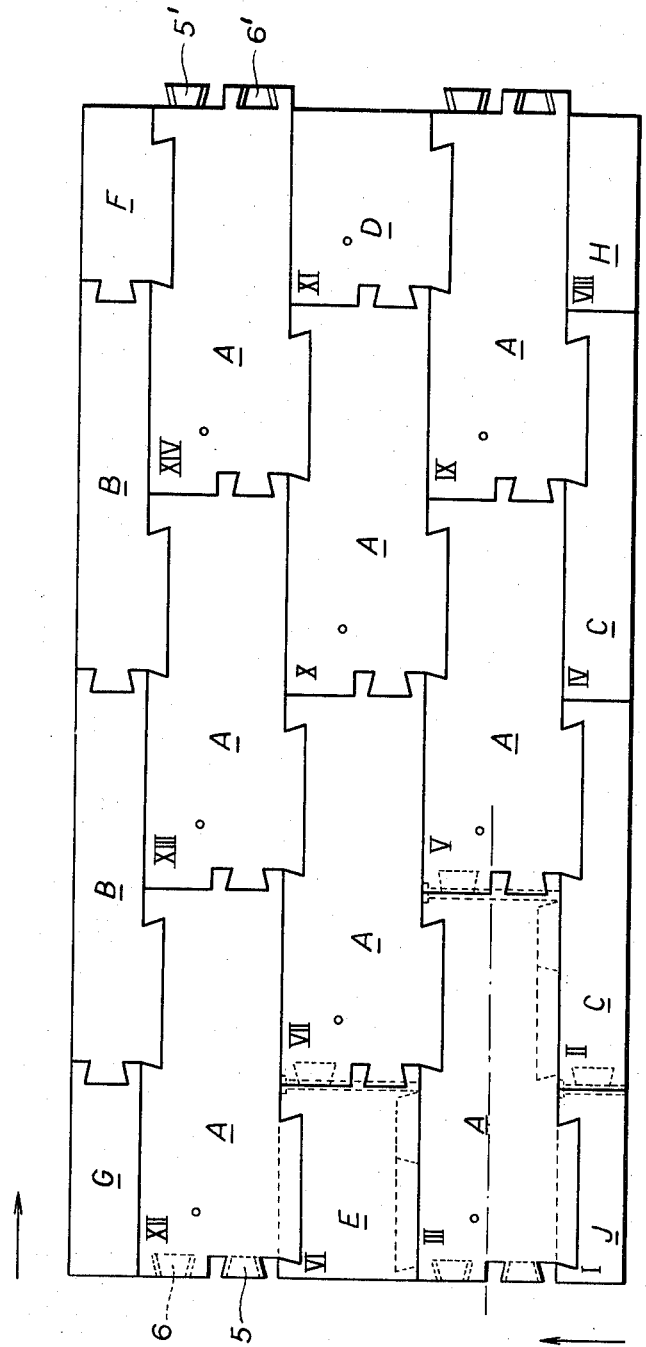

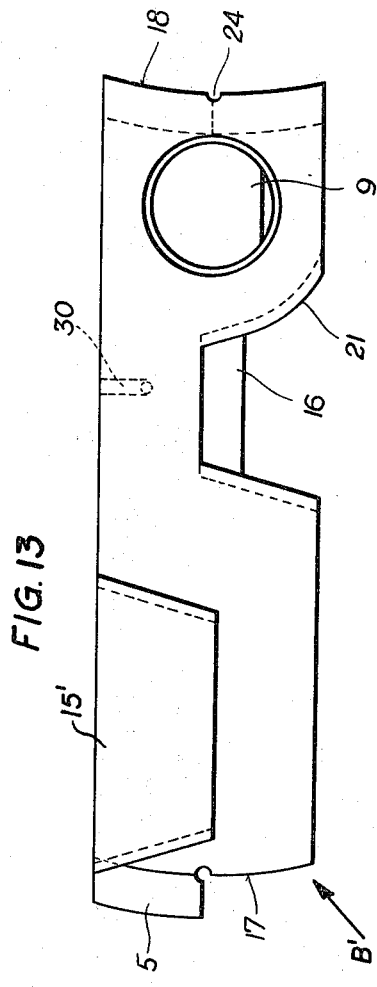
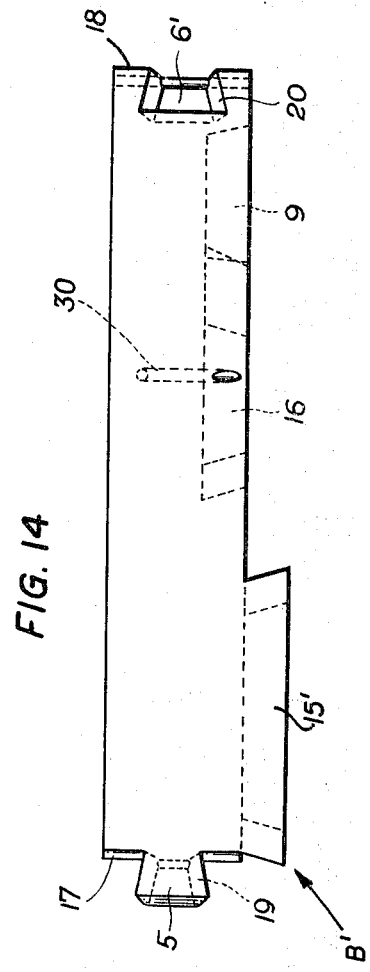
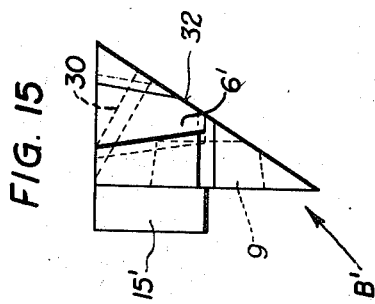

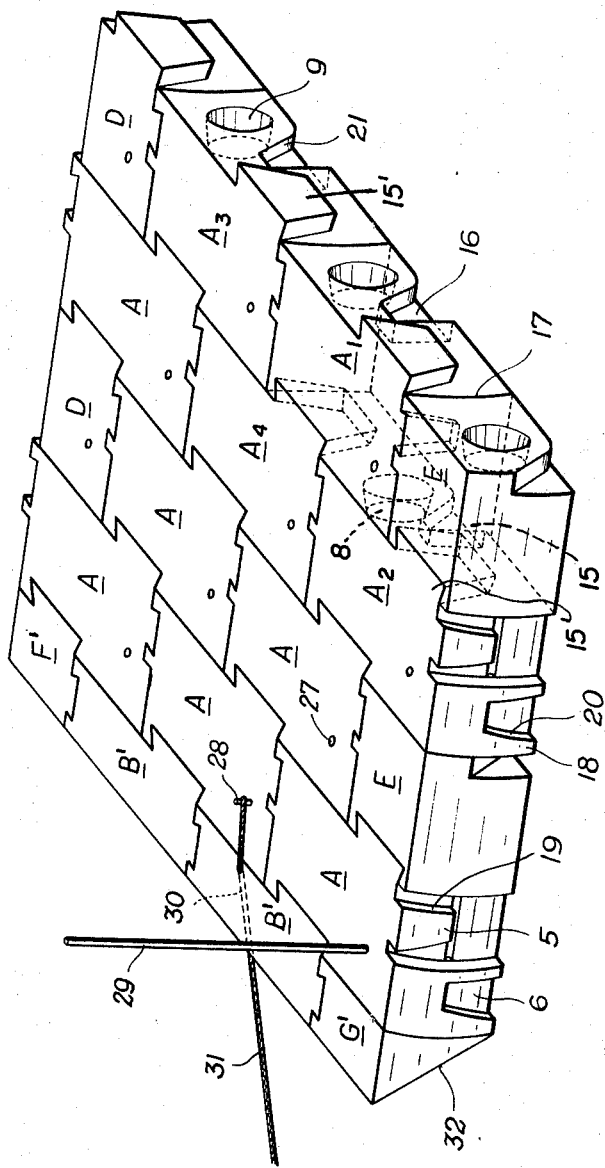

United States Patent Office 3,522,618
Patented Aug. 4, 1970

3,522,618
STRUCTURAL ELEMENT AND ASSEMBLY
Hermann Stranzinger, 1 Morzger Strasse,
Salzburg, Austria
Filed Jan. 26, 1968, Ser. No. 700,797
Claims priority, application Austria, Jan. 30, 1967,
A 830/67; Sept. 27, 1967, A 8,794/67
Int. Cl. E01d 15/08
U.S. Cl. 14—27                                8 Claims

ABSTRACT OF THE DISCLOSURE

A module for assembly with other, like modules into a bridge or other load-supporting structure has a convex and a concave end provided with complementary tenons and mortises for the interlinking of endwise adjoining modules. A dowel on one side of the module, centered on the axis of curvature of its convex end face, and a complementary bore closer to the concave face serve for pivotal attachment to a laterally juxtaposed module interlocking with two endwise adjoining modules via complementary formations including a lug and a recess having walls respectively curved about the axes of the dowel and the bore of the corresponding modules.

My present invention relates to a structural element, or module, designed for use in the erection of boat skeletons, floating bridges or pontoons, life rafts, concrete formwork and the like.

The general object of this invention is to provide a module which can be assembled with others of its kind into a load-supporting structure capable of convenient disassembly or modification by the addition or removal of such modules.

A more specific object is to provide a module of this description which, when thus assembled with others of its kind, forms a structure substantially free from gaps and crevices in which the foot of a person walking across the structure might be caught.

A related object is to provide a module configuration which enables the aforestated objects to be realized without elastic deformation of any component of the structure whereby these modules can be made of rigid material.

A module according to my invention has a generally parallelpipedic body whose parallel lateral surfaces are provided with mutually complementary pivotal formations (i.e. a dowel and a bore) as well as with two complementary locking formations (i.e. a lug and a recess) lying substantially entirely on the same side of an intermediate plane defined by the two pivotal axes, the body also having a pair of transverse end faces which are cylindrically concave and convex, respectively, with the same radius of curvature. The convex end face, which is located relatively close ot the first one of the two aforementioned pivotal formations (i.e. the dowel), is centered on the axis of that formation on which a curved edge of the first one of the two locking formations (i.e. the lug) is also centered. The second locking formation (i.e. the recess) has a curved wall centered on the axis of the second pivotal formation (i.e. the bore) which is located relatively close to the concave end face of the body. Furthermore, the two end faces are provided with complementary dovetail formations (i.e. a tenon and a mortise) which are engageable with mating formations on juxtaposed end faces of other, identical modules aligned with the first one; such alignment is maintainable with the aid of a further module extending alongside the two aligned modules in longitudinally offset and interlocked relationship therewith. Thus, the first module pivotally engages the laterally juxtaposed second module by their complementary dowel and bore, this second module being rigidly secured to the third module (aligned with the first one) whereby the second and third modules can jointly swing about the common pivotal axis of the first and second modules into a coplanar position in which the curvilinearly bounded lug and recess of the adjoining lateral surfaces of the first and second modules as well as the dovetail formations on the confronting end faces of the first and third modules interengage to maintain that position. Additional retaining means, such as a transversely inserted pin engaging in confronting grooves of the adjoining end faces, may be used to prevent untimely disalignment.

In order to secure the second and third modules to each other, their adjoining lateral surfaces may be formed with a projection and a mating depression which need not have cylindrically curved edges since, as will be apparent later on, these two modules swing relatively to each other about a rather remote axis. Like the aforementioned locking and dovetail formations, this projection and depression may be given a certain underout or draft whereby the male part diverges in the direction away from the body so that, with the female part correspondingly diverging inwardly, a positive interlock against detachment (except by relative displacement in a direction perpendicular to the axial plane of the dowels and bores of the modules) is ensured. On the other hand, the dowel and the bore may be slightly tapered in the opposite sense, i.e. with the width of the the male part (dowel) decreasing in the direction away from the body, to simplify the task of asembly. To the same end it is desirable to give the lateral projection and lug a generally trapezoidal outline, converging toward the intermediate axial plane, to complement a funnel-shaped outline of their female counterparts.

The dovetail formtaions on the two curved end faces of the body are advantageously arranged in pairs, each end face being formed with a tenon and with a mortise laterally offset therefrom.

The foregoing features will become more clearly apparent from the detailed description of a preferred embodiment given with reference to the accompanying drawing in which:

FIGS. 1, 2 and 3 are, respectively, a side elevation, a front elevation and a top plan view of a structural unit or module according to the invention;

FIGS. 4–7 are respective top plan views of elemental subunits obtained by longitudinally or transversely halving the module of FIGS. 1–3;

FIGS. 8–11 are similar views of further subunits obtained by longitudinally and transversely quartering the module of FIGS. 1–3;

FIG. 12 is a top plan view of a structure, specifically a floating bridge, assembled from units and subunits of the type shown in the prceding figures;

FIGS. 13, 14 and 15 are, respectively, a side elevation, a top plan view and a front elevation of a half-size subunit, of the type shown in FIGS. 4 and 5, modified for use as a marginal module; and FIG. 16 is a perspective view of the structure illustrated in FIG. 12, slightly modified.

In FIGS. 1–3 I have shown a module A, e.g. of plastic material, whose generally parallelepipedic body has a pair of flat lateral surfaces 11, 12, flat top and bottom surfaces 13, 14 and a pair of end faces 17, 18 which are cylindrically curved with identical radii of curvature. The cylinder segment formed by the convex end face 17 is centered on an axis $O_1$, perpendicular to sides 11 and 12, which also passes centrally through a slightly frustoconical dowel 8 projecting outwardly from side 11 at a location closer to end 17 than to end 18. A complementary bore 9 on the opposite side 12, centered on a second axis $O_2$, is disposed close to the concave end 18 of the module body. Axes $O_1$ and $O_2$ define an intermediate plane P dividing the body into an upper and a lower half.

The lower half of module A is formed with a lug 15 of generally trapezoidal outline projecting laterally from side 11 near the convex end 17. A complementary recess 16 is formed in the same half on the side 12 at a location closer to the concave end 18. The two locking formations 15 and 16 project slightly above the intermediate plane P, as seen in FIG. 1. Recess 16 has an edge 21 curved about axis $O_2$, a similar curvilinear 22 centered on axis $O_1$ being provided on lug 15. With the lug 15 widening outwardly and the recess 16 widening inwardly from surfaces 11 and 12, respectively, the surfaces formed by these curved edges are of frustoconical shape.

A trapezoidal formation 15', broadly similar to lug 15 but facing in the opposite direction, is provided on the upper part of lateral surface 12; the upper part of the opposite lateral surface 11 has a complementary trapezodal depression 16'. Again, the formations 15' and 16' project slightly beyond the intermediate plane P, as seen in FIG. 1.

The convex end face 17 carries two complementary, transversely offset dovetail formations, i.e. a tenon 5 in its upper part and a mortise 6 in its lower part; similar formations 5' and 6' are provided on the lower half and the upper half, respectively, of concave end face 18. Tenon 5 and mortise 6' converge downwardly whereas tenon 5' and mortise 6 converge upwardly; this enables the convex face 17 of module A to be swung from above into locking engagement with the concave face 18 of an identical module aligned therewith, as illustrated in FIGS. 12 and 16.

Tenons 5 and 5' are formed on a pair of recessed lands constituting the right-hand part of end face 17 (as viewed in FIG. 2) and the opposite, left-hand part of end face 18. These tenons share in the curvatures of the respective end faces so as to be flush therewith, as best seen in FIG. 1.

Two endwise-adjoining modules interlinked by their tenons 5, 5' and mortises 6, 6' may be locked together by a transverse pin 25 received in a bore 23 which extends inwardly, close to end face 17, from side 11 and continues as an open groove 23' on the recessed land carrying the tenon 5. A complementary groove 24 on the raised portion of face 18 (FIG. 1) also accommodates part of the retaining pin 25, which is provided with a head 26, so as to prevent their disengagement by a reversal of the motion, i.e. a swing about axis $O_1$, by which they were assembled. The undercut shape of the tenons and mortises, best seen in FIG. 3, prevents the lengthwise separation of the interlocked modules.

A tapped bore 27, sunk into the module body from its top 13, enables the fastening thereto of extraneous elements such as a standard 29, FIG. 16, or an anchor rope 31 attached to a bollard 28.

As illustrated in FIGS. 4 and 5, a module A may be split along a longitudinal median plane 33 (FIG. 3) into two half-size units B and C carrying, respectively, the formations 5, 6', 9, 15', 16 and 5', 6, 8, 15 and 16'. Also, a module can be divided along its transverse median plane 34 (FIG. 3) into two half-size units D and E, shown in FIGS. 6 and 7, respectively carrying the formations 5, 6, 8, 15, 15' and 5', 6', 9, 16, 16'. By a further halving of the units B–E we obtain quarter-size units F (FIG. 10), G (FIG. 11), H (FIG. 8) and J (FIG. 9).

FIG. 12 illustrates a structure, such as a floating bridge, composed of a combination of modules A–J. It will be noted that the half-size units B and C lie along the major sides of the rectangular structure, with the half-size units D and E positioned at the minor sides and the quarter-size units F, G, H, J placed at the corners.

For such bridge construction and similar purposes, the modules should be hollow bodies which may be internally partitioned into compartments. Solid bodies may, of course, be used if they are made from floatable material, e.g. wood.

Modules located along the edges of a bridge extending across flowing water may be provided with beveled undersides 32, FIGS. 15 and 16, as specifically illustrated in FIGS. 13–15 for a module B' derived from the module B shown in FIG. 5. Owing to this beveling, the bore 9 and the recess 16 pass partly through the body as seen in FIG. 13. FIGS. 13–15 also show how a marginal element, such as the module B', may be formed with an oblique bore 30 through which the rope 31 (FIG. 16) may pass.

In FIG. 16 there are shown four such beveled elements G', B', B', F' extending along one edge of a substantially rectangular structure similar to that illustrated in FIG. 12.

The assembly of a structure such as that shown in FIG. 16 may be carried out as follows:

Let us consider a corner unit $E_1$ and two adjoining modules $A_1$ and $A_2$. Upon pre-assembly of elements $E_1$ and $A_1$ by means of their interfitting formations 5, 6' and 5', 6 (cf. FIGS. 1–3) and insertion of retaining pin 25 at their contacting end faces, the dowel 8 of element $A_1$ is introduced into the bore 9 of element $A_2$ which at this instant is swung out of the plane of elements $A_1$ and $E_1$. Next, element $A_2$ is swung down about axis $O_2$ (counterclockwise as viewed in FIG. 1) so that its projection 15' enters the mating depression 16' of element $E_1$. At the same time the lug 15 of element $A_1$ engages in the recess 16 of element $A_2$ until all three elements lie in a common plane. Thereafter, a further element $A_3$ may be joined to element $A_1$ aligned therewith this being followed by a laterally juxtaposed element $A_4$, which—when swung into the common plane of the previously assembled elements—interlocks with adjoining elements $A_1$ and $A_2$.

The completion of the entire structure in the manner just described can be readily ascertained from FIG. 12 where, starting with I for the quarter-size unit J at the lower left-hand corner, the elements successively added have been designated by consecutive Roman numerals. The last full-size module A near the upper right-hand corner bears the designation XIV.

What is claimed is:

1. A module to be assembled with others of its kind into a load-supporting structure, comprising a generally parallelepipedic body with a pair of parallel lateral surfaces and a pair of transverse end faces, one of said end faces being cylindrically convex about a first transverse axis passing through said lateral surfaces at a location relatively close to said one of said end faces, the other of said end faces being cylindrically concave with a radius of curvature equal to that of said one of said end faces, one of said lateral surfaces being provided with a first pivotal formation centered on said first axis, the other of said lateral surfaces being provided with a complementary second pivotal formation centered on a second transverse axis parallel to said first axis and passing through said lateral surfaces at a location relatively close to said other of said end faces, said one of said lateral surfaces being further provided near said first pivotal formation with a first locking formation having a curved edge centered on said first axis and lying substantially entirely on one side of an intermediate plane defined by said first and second axes, said other of said lateral surfaces being further provided near said second pivotal formation with a complementary second locking formation having a curved edge centered on said second axis and lying substantially entirely on the same side of said intermediate plane for mating engagement with the first locking formation of a laterally juxtaposed but longitudinally offset identical second module fitted by its first pivotal formation onto said second pivotal formation of said body whereby an identical third module similarly joined to said second module is alignable with said body by swinging relatively thereto about the first pivotal axis of said second module to confront said other of said end faces of said body with the convex end face of said third module, each of said end faces being further provided with complementary dovetail formations engageable with those of aligned modules upon such relative swinging; said pivotal formations being a dowel and a bore, said locking formations being a lug and a recess, said dovetail formations being a tenon and a mortise.

2. A module as defined in claim 1 wherein said lateral surfaces are further provided with a projection and a complementary depression, respectively, for the joinder of said second and third modules.

3. A module as defined in claim 2 wherein said projection and depression are disposed substantially entirely on the side of said intermediate plane opposite said first and second locking formations.

4. A module as defined in claim 3 wherein said projection and depression are substantially trapezoidal and converge toward said intermediate plane.

5. A module as defined in claim 1 wherein each of said end faces is provided with a tenon and with a mortise laterally offset from said tenon.

6. A module as defined in claim 5 wherein said tenons are formed on recessed lands of said end faces.

7. A module as defined in claim 6 wherein said body is provided with a transverse bore passing through a raised portion of said convex end face from one of said lateral surfaces and terminating in a groove on the recessed land of said convex end face, said concave end face having a raised portion being provided with a complementary groove for receiving part of a retaining pin inserted into said transverse bore of an adjoining module.

8. A module as defined in claim 1 wherein said body is floatable.

References Cited
UNITED STATES PATENTS

| | | | |
|---|---|---|---|
| 1,852,715 | 4/1932 | Greenebaum | 52—392 |
| 2,401,453 | 6/1946 | Bell | 114—0.5 X |
| 2,680,698 | 6/1954 | Schnee | 94—13 |
| 2,876,726 | 3/1959 | Robishaw | 114—43.5 X |
| 2,999,431 | 9/1961 | Mitchell | 52—392 X |
| 3,125,009 | 3/1964 | Eberl | 94—13 X |
| 3,386,117 | 4/1968 | Sterner | 14—27 |

JACOB L. MACKENOFF, Primary Examiner

U.S. Cl. X.R.

52—392; 94—13; 114—0.5